United States Patent [19]
Sherman

[11] 3,795,072
[45] Mar. 5, 1974

[54] FISHING REEL

[76] Inventor: Thomas D. Sherman, 711 Daisy Ln., Fox Point, Wis. 53217

[22] Filed: Feb. 12, 1973

[21] Appl. No.: 332,051

[52] U.S. Cl............... 43/25, 43/20, 242/84.2 B
[51] Int. Cl............................................ A01k 89/00
[58] Field of Search........ 43/25, 20, 24; 242/84.2 B, 242/106

[56] References Cited
UNITED STATES PATENTS

| 399,588 | 3/1889 | Washburn............................. 43/25 |
| 2,083,689 | 6/1937 | Clifford............................ 242/84.2 B |
| 2,100,428 | 11/1937 | Bond........................................ 43/20 |
| 2,283,773 | 5/1942 | Teitsma.............................. 43/20 X |
| 2,634,920 | 4/1953 | Dunn............................ 242/84.2 B |
| 2,674,057 | 4/1954 | Stewart.................................. 43/20 |
| 2,677,509 | 5/1954 | Gage............................. 242/84.2 B |

FOREIGN PATENTS OR APPLICATIONS 645,520 11/1950 Great Britain........................ 43/20
1,538,527 7/1968 France..................................... 43/25

Primary Examiner—Louis G. Mancene
Assistant Examiner—Daniel J. Leach
Attorney, Agent, or Firm—Henry C. Fuller

[57] ABSTRACT

A fishing reel includes two spaced spools with the line stored on the spools in the form of elongated loops which encircle both spools. When casting, the spools do not rotate and the elongated loops slip from the spools in the manner of a spinning reel. The line is retrieved and wound on the spools by a belt arranged around pulleys or drive wheels on both spools with a handle connected to the belt for rotation of the belt. In one embodiment, the reel frame is pivotally mounted to the rod to position the spool axes parallel to the rod for casting and at right angles to the rod for rewinding the line.

11 Claims, 4 Drawing Figures

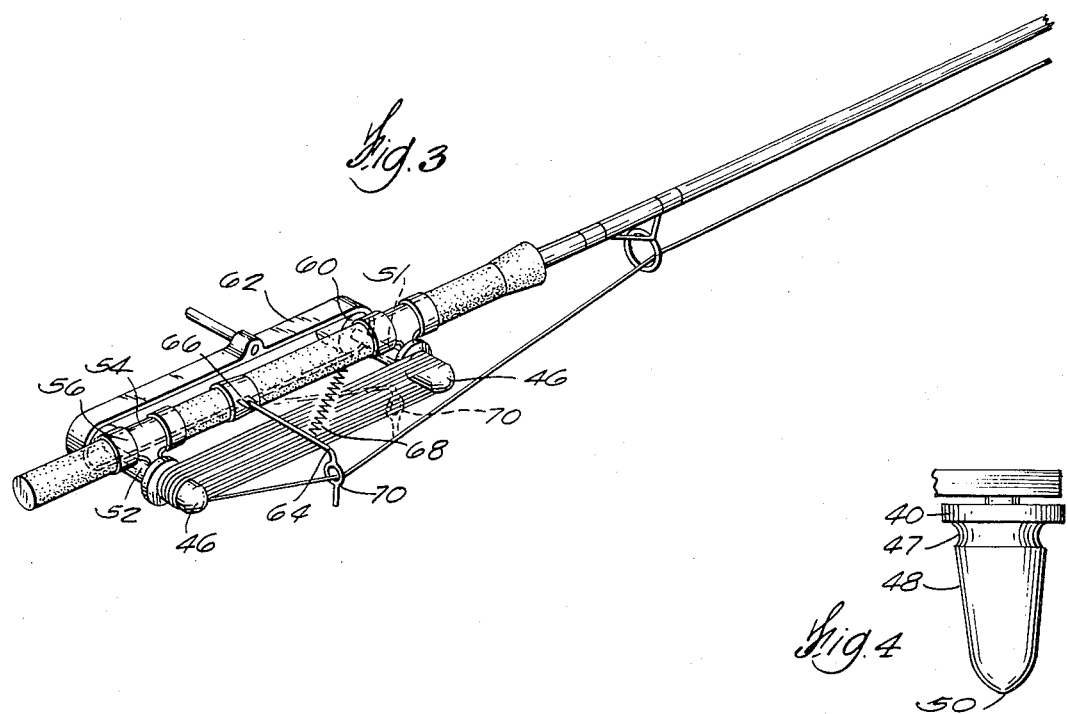
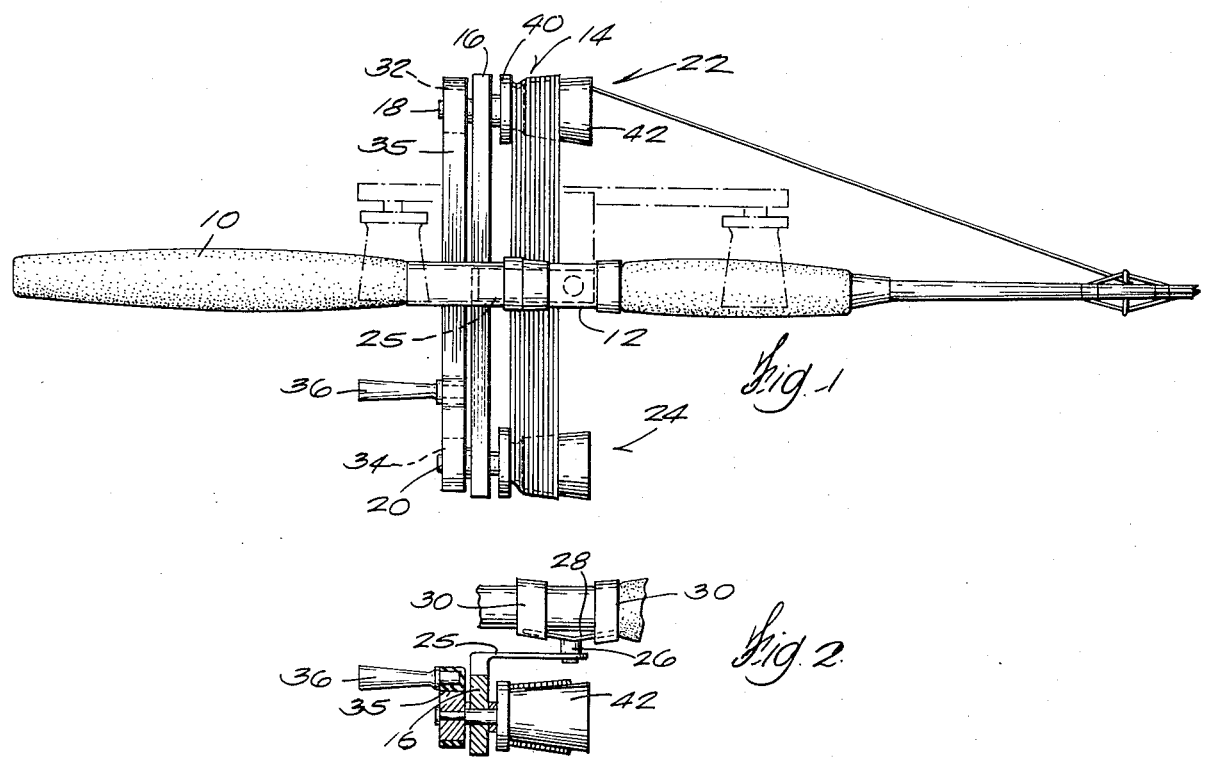

FISHING REEL

SUMMARY OF THE INVENTION

The reel of the invention has the advantages of both spinning and casting reels. Monofilament line and woven or braided line can be used. An increased storage capacity as compared with prior art spinning and casting and casting reels is afforded by the use of two spaced spools which are rotatably supported on a frame. The line is stored on the spool in elongated loops arranged around both spools. In one embodiment, the reel frame is pivotally supported on a rod for movement from a casting position with the spool axes parallel to the longitudinal axis of the rod and a second position for retrieval with the spool axes at right angles to the rod as in a conventional casting reel. The shafts which carry the spools are provided with pulleys or sprockets for receiving an endless belt or chain which is provided with a handle. Rewinding of the line is accomplished by rotating the belt and thus the spools. The use of the spaced spools increases the storage capacity of the reel and provides good casting distance as the large loops slip off the spools with a minimum resistance or drag.

Further objects, advantages and features of the invention will become apparent from the following disclosure.

DRAWINGS

FIG. 1 is a plan view of a fishing reel in accordance with the invention.

FIG. 2 is a fragmentary side elevational view of the reel shown in FIG. 1.

FIG. 3 is a perspective view of a modified embodiment of the invention.

FIG. 4 is a view of a modified form of a reel spool.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows a fishing rod 10 with a conventional reel seat 12. The fishing reel 14 includes a frame 16 which has apertures or bearings for rotatably supporting the spool axles 18 and 20 in spaced relationship. The spool axles 18 and 20 are respectively fixed to reel spools 22 and 24. Means are provided for connecting the reel to the rod 10. In the disclosed construction (FIG. 2), the means includes a bracket 25 which is secured to the frame portion 16 and extends at right angles thereto. The bracket 25 is rotatably connected to a post 26 which forms part of a reel mounting base 28, which is connectable to the slip or clamp rings 30 on the rod reel seat 12.

Means are provided for rotating the spools to rewind line. In the disclosed construction, the means includes pulleys, sprockets or drive wheels 32 and 34 respectively fixed to the axles 18 and 20, and an endless chain or belt 35 arranged around the pulleys. A handle 36 is connected to the belt for rotating the belt and thus the line spools. Various other arrangements can be employed for rotating the spools, including a narrow belt arranged around the inner ends of the line spools. Alternatively, a wide belt can be employed which forms a base for the stored line as well as a driving connection between both line spools. In addition to moving the belt with a handle on the belt, a crank on one axle can be employed, or various gearing arrangements and an electric motor.

In use of the embodiment shown in FIG. 1, the reel 14 is oriented in the solid line FIG. 1 position for casting and the line released from the reel with the hand of the user in a manner similar to that employed for the conventional open faced spinning reel, by release of the line by a finger. After the cast, the reel is rotated about the post 26 to the position shown in broken lines in FIG. 1 and the handle 36 manipulated to rotate the spools and store the line in elongated loops on the spools 22, 24.

In FIG. 1 the spools 22, 24 have an annular flange 40 with a frusto-conical body portion 42 extending from the flange with the large diameter of the body at the free end of the spool. Other spool configurations are shown in FIGS. 3 and 4, all of which have the annular flange 40 with different configurations for the body portions.

In FIG. 3 the reel body has a cylindrical portion with a rounded nose 46. In FIG. 4, the spool has an annular groove 47 adjacent the annular flange 40 with a body portion 48 tapered inwardly towards a rounded nose 50. The various spool configurations have certain advantages for different fishing techniques. For instance, the FIG. 4 embodiment is preferred for casting because of its easy release of the loops. The FIG. 1 embodiment of the spool is preferred for trolling.

The modified embodiment of the reel shown in FIG. 3 includes independent mounting arrangements for each of the spools. Each spool has an axle 51 rotatably supported in a bearing 52. The bearings 52 are carried in base portions 54 which have outturned ears which are received on reel seats with two slip or clamp rings 56. The axles 51 for the spools are each provided with a pulley or sprocket 60 for receiving a belt 62.

In the embodiment shown in FIG. 3, the axles remain at an angle transverse to the longitudinal axis of the rod. Casting is facilitated by a guide means 64 which can be pivotally connected to the rod by a hook and eye arrangement at 66 and spring biased by spring 68 to the position shown in dotted lines. When casting, the line is trained through the loop 70 on the guide 64 and held in a position approximately perpendicular to the rod with the casting hand. The line is also released during the cast by the fingers on the casting hand. When rewinding, the guide means 64 is released to the dotted line position and the line rewound on the spools by manipulating the crank 36. During rewinding, the spring tension will cause the guide to remain tight against the loops with the guide moving progressively outwardly of the spools as loops are added, thus providing a uniform winding process. The FIG. 3 embodiment also can be arranged for adjustable line capacity by varying the spacing of the spools by adjustment of the position of the reel seats. In addition, the FIG. 3 embodiment can be used without the guide and the line played out with one hand.

Although the axes of the spools are shown as parallel in the drawings, the spool axes can be supported so they diverge outwardly at the free ends of the spools.

The fishing reel of the invention can be used both as a casting or spinning type reel, without the disadvantages of these types of reels. Gearing can be eliminated, thus substantially reducing cost. The nature of the line storage on my fishing reel is such that kinks, twists, backlashes, and other problems resulting from storage of tight, small diameter loops of line are eliminated.

What is claimed is:

1. A fishing reel comprising a pair of spaced line spools rotatable about offset axes, means for supporting said spools on a fishing rod and means for simultaneously rotating both of said spools to rewind fishing line in elongated loops trained about both of said spools.

2. A fishing reel in accordance with claim 1 wherein said means for supporting said reel on a fishing rod includes a frame and a bracket adapted to be pivotally connected to a rod to afford movement of said reel from a casting position with the axes of said spools extending parallel to said rod and a rewind position with the axes of said spools transverse to the longitudinal axis of the rod.

3. A fishing reel in accordance with claim 1 in which said means for supporting said spools on a fishing rod includes individual mounting brackets for each of said spools.

4. A fishing reel in accordance with claim 1 wherein said means for supporting said spools comprises spool axles and said means for rotating said spools comprises driving wheels on each of said spools and an elongated flexible member arranged around said wheels and means connected to said flexible member to afford movement of said flexible member around said driving wheels to rotate said spools.

5. A fishing reel in accordance with claim 1 wherein said spools have a frusto-conical shape extending from an annular flange with an annular groove adjacent said flange.

6. A fishing reel in accordance with claim 1 wherein said spools have a cylindrical body with a tapered nose.

7. A fishing reel in accordance with claim 1 wherein said spools have a frusto-conical shape extending from an annular flange with the smallest diameter of said frustoconical portions at the free end of the spools.

8. A fishing reel in accordance with claim 1 wherein said spools have a frusto-conical shape extending from an annular flange with the largest diameter of said frustoconical portions at the free end of the spools.

9. A fishing reel in accordance with claim 3 in combination with a fishing rod having a handle and two spaced reel seats and line guides and guide means connected to said rod handle and extending outwardly from said handle intermediate said spools and including a guide member to guide line off said spools in an initial direction transverse to the longitudinal axis of said rod and in a subsequent direction toward said line guides.

10. A fishing reel in accordance with claim 9 wherein said guide means includes means for pivotally mounting said guide means to said rod handle for movement from a casting position to a rewind position.

11. A reel for storing an elongated flexible member comprising a pair of spaced storage spools, means for supporting the spools in spaced relation, and means for simultaneously rotating both of said spools to rewind the flexible member in elongated loops trained about both spools.

* * * * *